US012752779B2

(12) United States Patent
Styles et al.

(10) Patent No.: US 12,752,779 B2
(45) Date of Patent: Oct. 6, 2026

(54) SYSTEM FOR MONITORING A POSITION OF A VEHICLE

(71) Applicant: FUSION PROCESSING LIMITED, Bristol (GB)

(72) Inventors: Timothy Styles, Bristol (GB); Leon Wildman, Bristol (GB); Paul Davis, Bristol (GB); James Hutchinson, Bristol (GB)

(73) Assignee: FUSION PROCESSING LIMITED (GB)

( * ) Notice: Subject to any disclaimer, the term of this patent is extended or adjusted under 35 U.S.C. 154(b) by 250 days.

(21) Appl. No.: 17/693,302

(22) Filed: Mar. 11, 2022

(65) Prior Publication Data

US 2023/0286500 A1 Sep. 14, 2023

(51) Int. Cl.

*B60W 30/00* (2006.01)
*B60W 10/04* (2006.01)

(Continued)

(52) U.S. Cl.

CPC ............ *B60W 30/12* (2013.01); *B60W 10/04* (2013.01); *B60W 10/18* (2013.01); *B60W 10/20* (2013.01); *B60W 50/14* (2013.01); *G06T 7/73* (2017.01); *G06V 10/56* (2022.01); *G06V 20/588* (2022.01); *H04N 23/90* (2023.01); *B60W 2300/10* (2013.01); *B60W 2300/12* (2013.01);

(Continued)

(58) Field of Classification Search

CPC ...... B60W 30/12; B60W 10/04; B60W 10/18; B60W 10/20; B60W 50/14; B60W 2300/10; B60W 2300/12; B60W 2420/403; B60W 2552/53; B60W 2050/143; G06T 7/73; G06T 2207/30256; G06T 2207/10024; G06V 10/56; G06V 20/588; H04N 23/90; H04N 23/56

See application file for complete search history.

(56) References Cited

U.S. PATENT DOCUMENTS

| | | | |
|---|---|---|---|
| 6,057,754 | A | 5/2000 | Kinoshita et al. |
| 2012/0062745 | A1 | 3/2012 | Han et al. |

(Continued)

FOREIGN PATENT DOCUMENTS

| | | | |
|---|---|---|---|
| CN | 104309606 | B | 1/2015 |
| CN | 108944927 | B | 12/2018 |

(Continued)

OTHER PUBLICATIONS

Examination Report was issued in connection with GB Patent Application No. GB2103953.2, mailed Nov. 6, 2023, 4 pages.

(Continued)

*Primary Examiner* — Khoi H Tran
*Assistant Examiner* — Tien Minh Le

(57) ABSTRACT

A system for monitoring a position of a vehicle in a lane of a road, the system comprising: a processor; a first camera configured to output first image data relating to a surface of the road on a first side of the vehicle; a second camera configured to output second image data relating to a surface of the road on a second side of the vehicle, wherein the processor is configured to determine if the vehicle is at risk of straying outside the lane based on the first image data or the second image data and auxiliary data received by the processor.

18 Claims, 13 Drawing Sheets

(51) Int. Cl.

| | |
|---|---|
| ***B60W 10/18*** | (2012.01) |
| ***B60W 10/20*** | (2006.01) |
| ***B60W 30/12*** | (2020.01) |
| ***B60W 50/14*** | (2020.01) |
| ***G06T 7/73*** | (2017.01) |
| ***G06V 10/56*** | (2022.01) |
| ***G06V 20/56*** | (2022.01) |
| ***H04N 23/90*** | (2023.01) |
| *H04N 23/56* | (2023.01) |

(52) U.S. Cl.
CPC ... *B60W 2420/403* (2013.01); *B60W 2552/53* (2020.02); *G06T 2207/30256* (2013.01); *H04N 23/56* (2023.01)

(56) References Cited

U.S. PATENT DOCUMENTS

| | | | |
|---|---|---|---|
| 2014/0052340 A1 | 2/2014 | Bajpai | |
| 2015/0235140 A1* | 8/2015 | Rothermel | B60W 30/18163 706/52 |
| 2016/0325682 A1 | 11/2016 | Gupta et al. | |
| 2017/0267177 A1* | 9/2017 | Nariyambut Murali | G06F 18/24133 |
| 2018/0053060 A1 | 2/2018 | Huang et al. | |
| 2018/0197021 A1* | 7/2018 | Lee | G06V 20/588 |
| 2020/0285863 A1* | 9/2020 | Sadjadi | G08G 1/167 |
| 2020/0385022 A1 | 12/2020 | Eguchi | |
| 2021/0314497 A1* | 10/2021 | Nemeth | B60R 1/00 |
| 2022/0032994 A1* | 2/2022 | Fusconi | B62D 15/025 |
| 2022/0198200 A1* | 6/2022 | LaPonse | G01S 17/931 |
| 2023/0399049 A1* | 12/2023 | Caldwell | B60W 50/10 |

FOREIGN PATENT DOCUMENTS

| | | |
|---|---|---|
| DE | 102017120773 A1 | 3/2019 |
| EP | 4064219 A2 | 9/2022 |

OTHER PUBLICATIONS

Search Report was issued in connection with United Kingdom Patent Application No. 2103953.2, mailed Sep. 15, 2021, 5 pages.
Partial European Search Report was issued in connection with European Patent Application No. 22161417.5 mailed Aug. 17, 2022.
Office Action was issued in connection with European Patent Application No. 22161417.5 mailed Dec. 4, 2024, 6 pages.

* cited by examiner

SYSTEM FOR MONITORING A POSITION OF A VEHICLE

FIELD OF THE INVENTION

The present disclosure relates to a system for monitoring a position of a vehicle. In particular, the present disclosure relates to a system for monitoring a position of a vehicle in a lane of a road.

BACKGROUND

Many vehicles can now be equipped with sophisticated driver assistance systems, such as cruise control systems for maintaining a constant vehicle speed, automatic emergency braking systems for automatically slowing or stopping the vehicle if an obstacle is detected in the path of the vehicle, and automatic distance control systems for maintaining a constant distance from a vehicle ahead.

Some vehicles are also provided with lane assist or lane departure warning systems, which monitor the vehicle's position with respect to lane markings on the road and provide an audible and/or haptic warning signal if the system determines (based on the monitored position of the vehicle) that the vehicle is straying out of lane or is at risk of straying out of lane, to prompt the driver to take corrective action to restore the vehicle to a safe position within the lane.

Some vehicles are provided with more sophisticated active lane keeping systems, which monitor the vehicle's position with respect to the lane markings and actively correct the vehicle's position, e.g. by braking the wheels on only one side of the vehicle or by turning the front wheels, if the system determines (based on the monitored position of the vehicle) that the vehicle is straying out of lane or is at risk of straying out of lane. Such systems therefore do not require driver intervention to correct the position of the vehicle.

Lane assist and active lane keeping systems typically use a forward-facing camera mounted, e.g. in a windscreen of the vehicle to monitor the area in front of the vehicle and detect lane markings based on differences in contrast between the typically light-coloured (e.g. white) lane markings and the typically dark-coloured (e.g. black) road surface.

A disadvantage of such systems is that it can be difficult for the system to detect road markings in some road conditions and/or in some environmental conditions. For example, if the road is wet, bright sunlight reflecting from the road surface can obscure the lane markings, making them difficult to detect by the system. Similarly, in low light conditions it may be difficult for the system to detect road markings. Also the lane (or its markings) may be obscured by other vehicles or obstructions, so forward-facing camera may not always have the lane ahead. As will be appreciated, these disadvantages are undesirable as the lane assist or lane keeping system cannot be relied upon to provide the necessary warning and/or correction in the event that the vehicle strays out of lane. A highly reliable method of lane detection and lane keeping is a key requirement for fully automated driving systems.

SUMMARY

According to a first aspect, the invention provides a system for monitoring a position of a vehicle in a lane of a road, the system comprising:

a processor;

a first camera configured to output first image data relating to a surface of the road on a first side of the vehicle;

a second camera configured to output second image data relating to a surface of the road on a second side of the vehicle, wherein the processor is configured to determine if the vehicle is at risk of straying outside the lane based on the first image data or the second image data and auxiliary data received by the processor.

The processor may be configured to estimate a position of the vehicle within the lane based on the first image data or the second image data, and to determine if the vehicle is at risk of straying outside the lane based on the estimated position of the vehicle and the auxiliary data.

The auxiliary data may be received from a forward-facing camera provided on the vehicle.

The auxiliary data may be received from a mapping, location or route planning system.

The processor may be configured to output a control signal to a driver warning system if it is determined that the vehicle is at risk of straying outside the lane.

The processor may be configured to output a control signal to one or more of: a brake control subsystem; a throttle control subsystem; and a steering control subsystem, to correct a course of the vehicle if it is determined that the vehicle is at risk of straying outside the lane.

The processor may be configured to determine a value representative of a distance and/or an angle between the vehicle and a lane marking that delimits a boundary of the lane based on the first or second data.

The first and second cameras may each be provided or associated with an image processing subsystem.

The image processing subsystem may be configured to detect the presence and/or position of a lane marking in the image data provided by the respective camera and to transmit data indicative of the presence and/or position of the lane marking to the processor.

The processor may be configured to determine a value representative of a distance and/or an angle between the vehicle and the lane marking based on the data indicative of the presence and/or position of the lane marking.

The processor may be configured to compare the value representative of the distance to a threshold and to defer outputting a control signal if the value is greater than the threshold, or to output a control signal if the value is equal to or less than the threshold.

The processor may be configured to detect the presence of a lane marking in the first or second image data based on a difference in colour or a difference in contrast between the lane marking and the surface of the road.

The image processing subsystem may be configured to detect the presence of a lane marking based on a difference in colour or a difference in contrast between the lane marking and the surface of the road.

The system may further comprise:

a third camera configured to output third image data relating to the surface of the road on the first side of the vehicle; and a fourth camera configured to output fourth image data relating to the surface of the road on the second side of the vehicle.

Each camera may be provided with a source of illumination.

The source of illumination may comprise an infra-red lamp.

According to a second aspect, the invention provides a vehicle comprising a system for monitoring a position of the vehicle in a lane of a road, wherein the system comprises:

a processor;

a first camera positioned on a first side of the vehicle in a downward-facing orientation to provide first image data relating to a surface of the road on the first side of the vehicle;

a second camera positioned on a second side of the vehicle in a downward-facing orientation to provide second image data relating to a surface of the road on a second side of the vehicle, wherein the processor is configured to determine if the vehicle is at risk of straying outside the lane based on the first image data or the second image data and auxiliary data received by the processor.

The processor may be configured to estimate a position of the vehicle within the lane based on the first image data or the second image data, and to determine if the vehicle is at risk of straying outside the lane based on the estimated position of the vehicle and the auxiliary data.

The vehicle may further comprise a forward-facing camera for providing the auxiliary data to the processor.

The vehicle may further comprise a mapping, location or route planning system for providing the auxiliary data to the processor.

The vehicle may further comprise a driver warning system, and wherein the processor is configured to configured to output a control signal to the driver warning system if it is determined that the vehicle is at risk of straying outside the lane.

The vehicle may further comprise one or more of:

a brake control subsystem;

a throttle control subsystem; and a steering control subsystem, and wherein the processor is configured to output a control signal to one or more of the brake control subsystem, the throttle control subsystem, and the steering control subsystem to correct a course of the vehicle if it is determined that the vehicle is at risk of straying outside the lane.

The processor may be configured to determine a value representative of a distance and/or an angle between the vehicle and a lane marking that delimits a boundary of the lane based on the first or second image data.

The first and second cameras may each be provided or associated with an image processing subsystem.

The image processing subsystem may be configured to detect the presence and/or position of a lane marking in the image data output by the respective camera and to transmit data indicative of the presence and/or position of the lane marking to the processor.

The processor may be configured to determine a value representative of a distance and/or an angle between the vehicle and the lane marking based on the data indicative of the presence and/or position of the lane marking.

The processor may be configured to compare the value representative of the distance to a threshold and to defer outputting a control signal if the value is greater than the threshold, or to output a control signal if the value is equal to or less than the threshold.

Each camera may be provided with a source of illumination comprising an infra-red lamp.

According to a third aspect, the invention provides a vehicle according to the second aspect.

The vehicle may comprise a bus, a minibus, a car, a van, a lorry, a truck or a taxi, for example.

BRIEF DESCRIPTION OF THE DRAWINGS

Embodiments of the invention will now be described, strictly by way of example only, with reference to the accompanying drawings, of which.

DETAILED DESCRIPTION

Figure 1A:
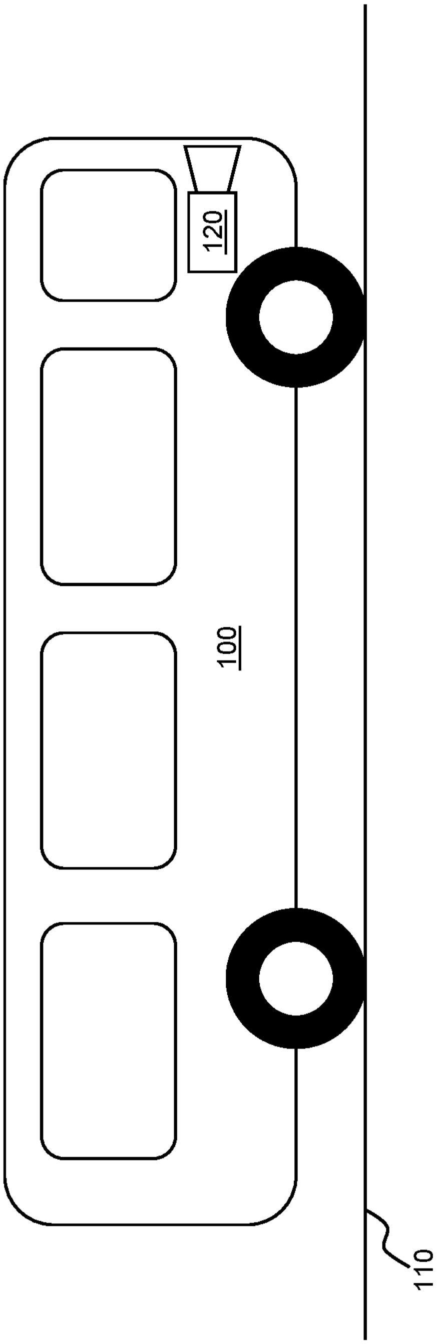
FIGS. 1*a* and 1*b* schematically illustrate a vehicle equipped with a forward-facing camera for use by a lane assist or lane keeping system.
Figure 1B:
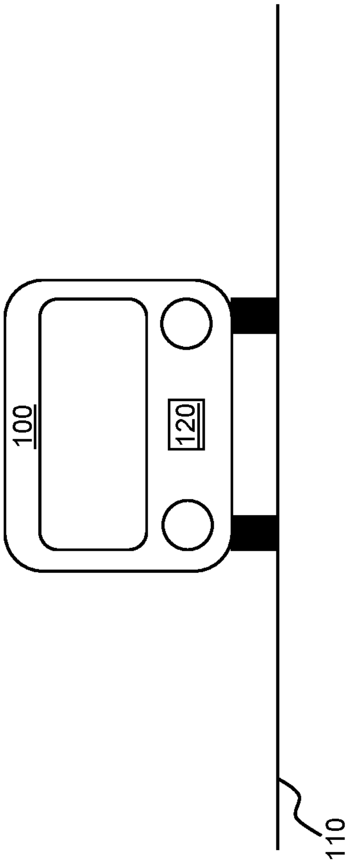

Referring first to FIGS. 1*a* and 1*b*, a vehicle (in this example a bus) is shown generally at 100. FIG. 1*a* shows a side view of the vehicle 100, whilst FIG. 1*b* is a view of the front of the vehicle 100. As the vehicle 100 travels along a road 110, a forward-facing camera 120 provides image data to a lane assist or lane keeping system (not shown), which is operative to provide a warning and/or actively correct the vehicle's position if the vehicle 100 begins to stray out of lane, as described above.

As explained above, systems which rely on forward-facing cameras to detect lane markings may not be effective in some road conditions and/or in some environmental conditions, or in congested conditions when lanes or lane markings may not be visible to a forward-facing camera. Thus a need exists for a system that can reliably detect the position of a vehicle within a lane in a range of road and/or environmental conditions.

Figure 2:
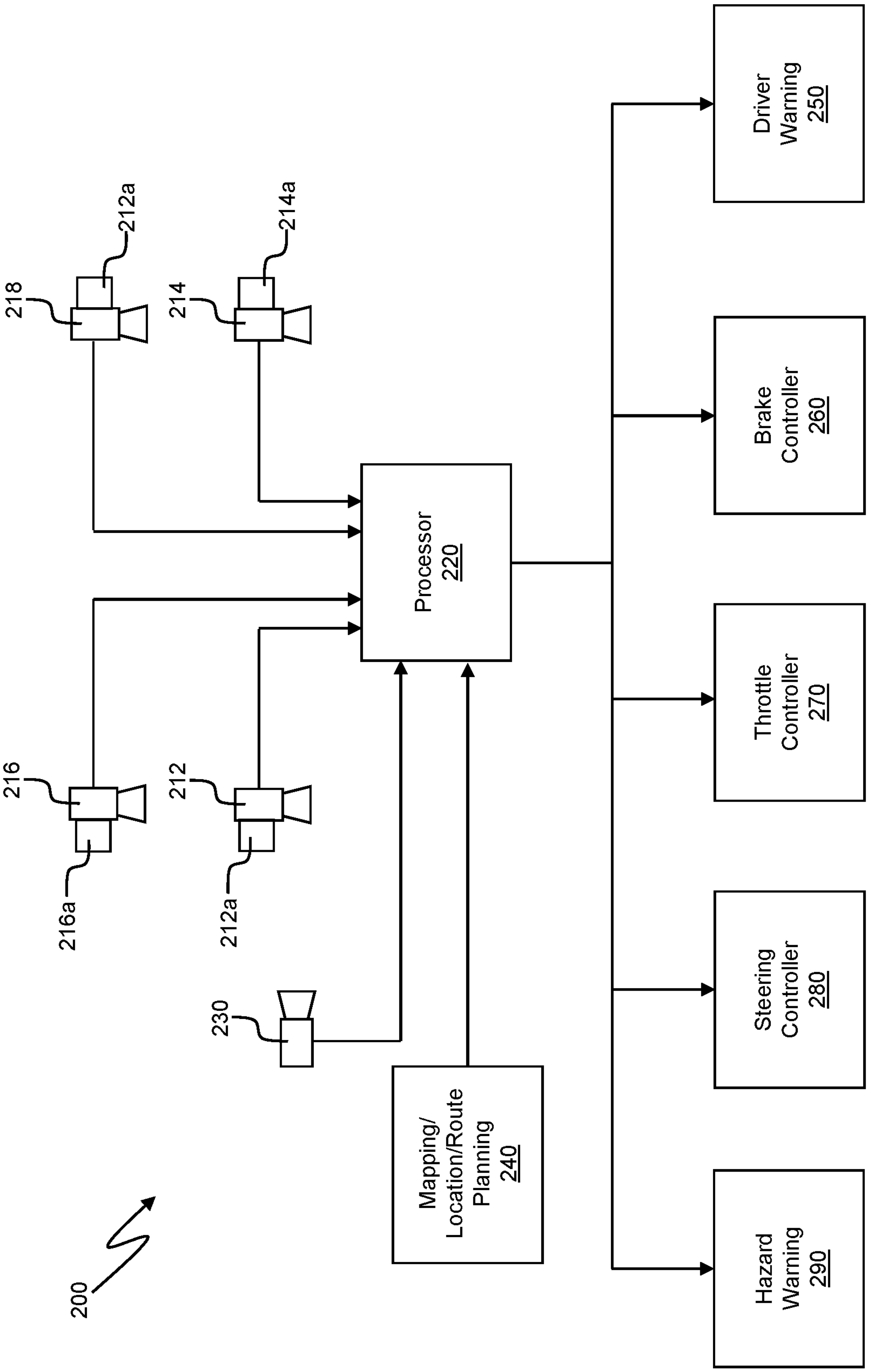
FIG. 2 is a schematic illustration of a system according to the present disclosure.

FIG. 2 is a schematic representation of a system for monitoring a position of a vehicle in a lane on a road.

The system, shown generally at 200, includes a first camera 212, configured to be mounted on a first side of a vehicle in a downward-facing orientation such that the first camera 212 captures image data of a road surface on the first side of the vehicle. Thus the first camera 212 may be referred to as a first downward-facing camera.

The system 200 further includes a second camera 214, configured to be mounted on a second side of the vehicle (the second side being opposed to the first side of the vehicle) in a downward-facing orientation such that the second camera 214 captures image data of a road surface on the second side of the vehicle. Thus the second camera 214 may be referred to as a second downward-facing camera.

The system 200 may further include a third downward-facing camera 216 configured to be mounted on the first side of the vehicle at a position spaced from the first downward-facing camera 212, and a fourth downward-facing camera 218 configured to be mounted on the second side of the vehicle at a position spaced from the second downward-facing camera 214.

Each of the downward-facing cameras 212-218 may be provided with a respective source of illumination 212*a*-218*a* for illuminating the road surface in the field of view of the camera, to facilitate or improve detection of lane markings. Each source of illumination 213*a*-218*a* may comprise, for example, an infra-red lamp.

The system 200 further includes a processor 220, having first and second inputs for receiving first and second data from the first and second downward-facing cameras 212, 214 respectively. Where the third and fourth downward-facing cameras 216, 218 are provided, the processor 220 may have third and fourth inputs for receiving third and fourth data from the third and fourth downward-facing cameras 216, 218 respectively.

The first and second downward-facing cameras 212, 214, and the third and fourth downward facing cameras 216, 218 (where provided) may be configured to provide a continuous stream of image data (e.g. captured image frames) in real-time to the processor 220. Alternatively the downward-facing cameras 212-218 may be configured to provide image data to the processor 220 at discrete time intervals. For example, the downward-facing cameras 212-218 may be each be configured to provide 5, 10 or 20 captured image frames per second to the processor 220.

The processor 220 has a further input for receiving forward image data from a forward-facing camera 230. The forward-facing camera 230 may be provided as part of the system 200, or may be a pre-existing forward-facing camera of the vehicle in which the system 200 is installed.

The processor 220 has a further input for receiving mapping and/or location and/or route planning data from a mapping/location/route planning unit 240. The mapping/location/route planning unit 240 may be provided as part of the system 200, or alternatively may be a pre-existing unit of the vehicle in which the system 200 is installed.

The processor 200 may be implemented, for example, by a general purpose computing system (e.g. a personal computer, laptop computer, tablet computer or the like) executing appropriate software, or alternatively may be implemented in one or more GPUs (Graphics Processing Units), ASICs (Application Specific Integrated Circuits), FPGAs (Field Programmable Gate Arrays), DSPs (Digital Signal Processors) or the like, or by a combination of such systems and/or devices.

The processor 200 has outputs for outputting control signals to one or more of a driver warning subsystem 250, a brake controller subsystem 260, a throttle controller subsystem 270, a steering controller subsystem 280 and a hazard warning subsystem 290. These subsystems may be provided as part of the system 200, or may alternatively be pre-existing subsystems of the vehicle.

The processor 220 is configured to receive the first and second data from the first and second downward-facing cameras 212, 214 and to process the received data to detect the presence and/or position of lane markings in the data. For example, the processor 220 may be configured to detect the presence and/or position of lane markings in images received from the first and second downward-facing cameras 212, 214 based on a contrast or a difference in colour between the road surface and the lane markings.

For example, if the road surface is a dark colour such as black or grey and the lane markings are a lighter colour such as white or yellow, the processor 220 may detect the lane markings by detecting the difference in colour between the lane marking and the surrounding road surface, or by detecting the contrast between the dark road surface and the lighter lane marking.

The processor 220 may be further configured to distinguish between lane markings and other features of the road surface (e.g. potholes, directional arrows, writing etc.) or objects on the road surface (e.g. dirt or debris, litter etc.) based on other characteristics of the lane markings such as shape or size. For example, if an image received from a downward facing camera includes high-contrast or light-coloured area whose shape and/or size is within a predefined range of shapes and/or sizes, the processor 220 may determine that a lane marking is present in the image, whereas if the shape and/or size of the high-contrast or light-coloured area are outside the predefined range of shapes and/or sizes, the processor 220 may determine that the detected high-contrast or light-coloured area is not a lane marking.

The processor 220 is configured to infer, estimate or otherwise determine, based on detected lane markings (e.g. lane marking detected in image data from the downward-facing cameras 212-218), a position of the vehicle relative to the detected lane marking. The processor 220 is further configured to determine, based on the determined position of the vehicle and auxiliary data (e.g. mapping/location/route planning data from the mapping/location/route planning unit 240 and/or the forward image data from the forward-facing camera 230 (if provided)), if the vehicle has started to stray outside the lane, or is at risk of straying outside the lane.

If the processor 200 determines that the vehicle has started to stray outside the lane, or is at risk of straying outside the lane, it transmits appropriate control signals to one or more of the subsystems 250-290 to cause the subsystem(s) 250-290 to take appropriate action, e.g. to issue a warning to prompt the driver to take action to correct the course of the vehicle, and/or to accelerate, brake or steer the vehicle to correct the course of the vehicle autonomously, to perform an emergency braking or stopping manoeuvre and/or to initiate a hazard warning for neighbouring vehicles, e.g. by switching on the vehicle's hazard warning lights.

In the example described above, the cameras 212-218 are configured to transmit image data to the processor 220, and the processor 220 is configured to detect the presence and/or position of lane markings in the image data.

In an alternative example, each of the cameras 212, 214 (and 216, 218, where provided) may be configured to detect the presence and or position of lane markings locally (e.g. based on differences in contrast, colour, shape, size etc. as described above) and to transmit data indicative of the presence and/or position of the detected lane markings to the processor 220.

Thus, each of the cameras 212-218 may be provided or associated with one or more image processing subsystems (e.g. processing hardware and/or software and/or firmware) configured to process image data generated by the camera to detect the presence and/or position of lane markings in image data generated by the camera and to transmit data indicative of the presence and/or position of the detected lane markings to the processor 220.

In some examples, the or each image processing subsystem may be configured to detect the presence of a lane marking in the image data output by its respective camera 212-218, and to estimate, calculate or otherwise determine a distance between the vehicle and the detected lane marking, and to transmit data indicative of the detection of the lane marking and the determined distance to the processor 220. The or each image processing subsystem may be further configured to estimate, calculate or otherwise determine an angle between the vehicle and the detected lane marking (e.g. an angle between the side of the vehicle and the detected lane marking).

In other examples, the or each image processing subsystem may transmit only data indicative of detection of a lane marking in the image data generated by the camera and data indicative of the position of the lane marking within the image (e.g. pixel row and column coordinate data or the like) to the processor 220, and the processor 220 may calculate, estimate or otherwise determine the distances between the vehicle and the lane markings based on the received data.

The processor 220 may also calculate, estimate or otherwise determine an angle between the vehicle and a lane marking based on the received data.

The processor 220 may then infer, estimate or otherwise determine, based on the data received from the cameras 212-218 related to the detected lane markings, the position and/or angle of the vehicle relative to the detected lane marking(s), and determine, based on the determined position and/or angle of the vehicle and auxiliary data (e.g. mapping/location/route planning data from the mapping/location/route planning unit 240 and/or the forward image data from the forward-facing camera 230 (if provided)), if the vehicle has started to stray outside the lane, or is at risk of straying outside the lane.

Figure 3A:
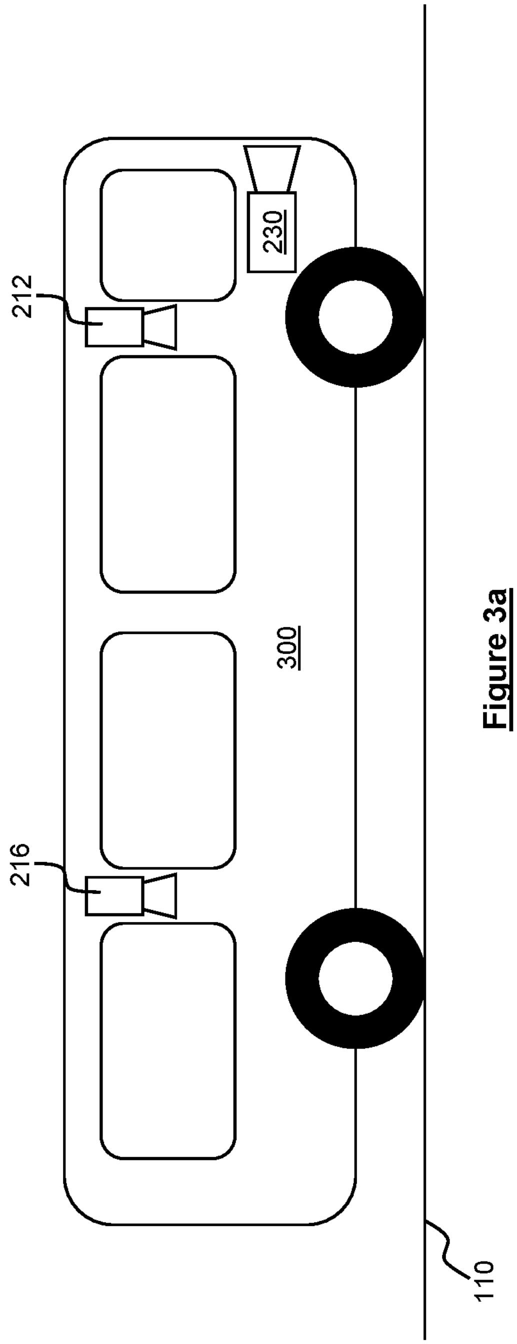
FIGS. 3*a* and 3*b* schematically illustrate a vehicle equipped with the system of FIG. 2.
Figure 3B:
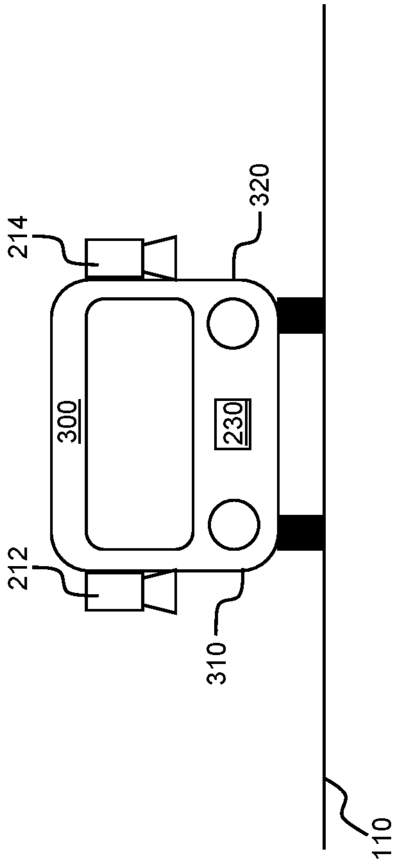

FIGS. 3*a* and 3*b* show a vehicle 300 (in this example a bus) on which the system 200 of FIG. 2 has been installed. FIG. 3*a* shows a side view of the vehicle 300, whilst FIG. 3*b* is a view of the front of the vehicle 300.

As can be seen from FIGS. 3*a* and 3*b*, the first downward-facing camera 212 is installed towards the front of a first side 310 of the vehicle 300 in a downward-facing orientation, such that as the vehicle 300 travels along a road 110 the first downward-facing camera 212 captures images of the surface of the road 110 on the first side 310 of the vehicle 300.

The second downward-facing camera 214 is installed towards the front of a second side 320 of the vehicle 300 in a downward facing orientation, such that as the vehicle 300 travels along the road 110 the second downward-facing camera 214 captures images of the surface of the road 110 on the second side 320 of the vehicle 300.

The third downward-facing camera 216 (where provided) is installed towards the rear of the first side 310 of the vehicle 300 in a downward-facing orientation, such that as the vehicle 300 travels along a road 110 the third downward-facing camera 216 captures images of the surface of the road 110 on the first side 310 of the vehicle 300.

The fourth downward facing camera 218 (where provided), which is not shown in FIGS. 3*a* and 3*b*, is installed towards the rear of the second side 320 of the vehicle 300 in a downward facing orientation, such that as the vehicle 300 travels along the road 110 the fourth downward-facing camera 218 captures images of the surface of the road 110 on the second side 320 of the vehicle 300.

Because the downward-facing cameras 212-218 are directed towards the surface of the road 110, they are able to provide clear images of the road surface that permit detection of lane markings in a wider range of road and environmental conditions than forward-facing cameras. In particular, the downward-facing cameras 212-218 are less prone to the problems experienced by forward-facing cameras arising from reflected sunlight, low light conditions and congested road conditions. This is partly because the cameras 212-218 are typically physically closer to the road surface than a forward-facing camera would be. Additionally, because the lenses of the cameras 212-218 face downwardly, they are less likely than a forward-facing camera to become obscured, e.g. by rain or other precipitation, and thus are able to continue to capture high-quality images of the road surface even in adverse weather conditions.

In the example illustrated in FIG. 3 a forward-facing camera 230 is also provided, positioned towards the front of the vehicle 300 such that as the vehicle travels along the road 110 the forward-facing camera 230 captures images of the road ahead of the vehicle 300. In other examples the forward-facing camera 230 may be omitted.

The processor 220 (not shown in FIGS. 3*a* and 3*b*) is provided in a suitable area of the vehicle 300, e.g. in a suitable cabinet or rack within the vehicle 300. The mapping/location/route planning unit 240 (also not shown in FIGS. 3*a* and 3*b*), if provided, may be co-located with the processor 220, or may be provided in any other suitable area of the vehicle 300. Similarly, the subsystems 250-290 (which are also not shown in FIGS. 3*a* and 3*b*) are provided in any suitable area of the vehicle.

FIGS. 4*a*-4*e* are schematic views from above the vehicle 300 as it travels along a road 110. A lane 116 of the road 110 has boundaries that are delimited by first and second lane markings 112, 114. The segment 412 shown in dashed outline represents a field of view of the first downward-facing camera 212. Similarly, the segments 414-418 represent the fields of view of the second, third and fourth downward-facing camera 214-218, and the segment 430 represents the field of view of the forward-facing camera 230.

Figure 4A:
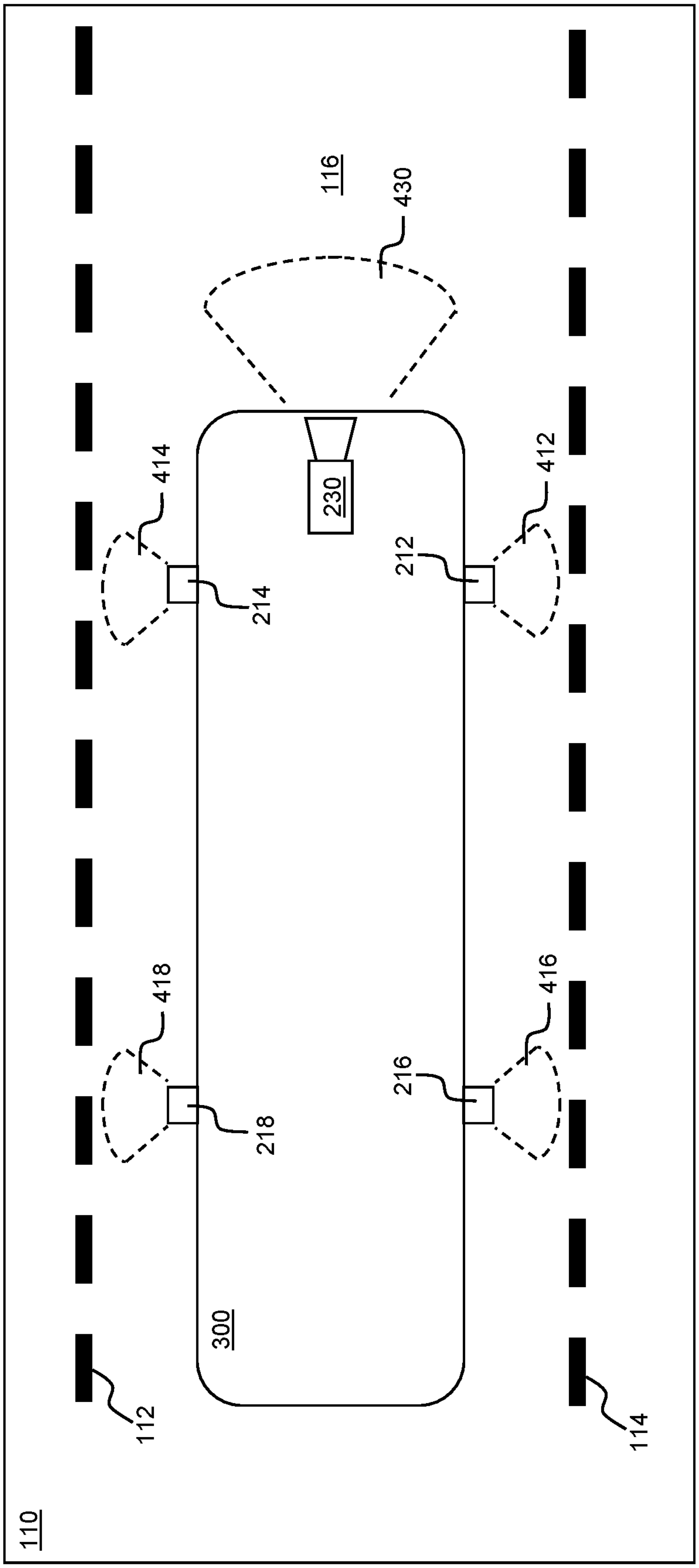
FIGS. 4*a*-4*e* are schematic views from above showing the vehicle of FIGS. 3*a* and 3*b* as it travels along a road.

In FIG. 4*a* the vehicle 300 is shown as being positioned generally centrally in the lane 116. As can be seen in FIG. 4*a*, neither of the lane markings 112, 114 is within the field of view of any of the downward-facing cameras 212-218. Thus, the images captured by the cameras 212-218 will be dominated by the road 110.

Figure 4B:
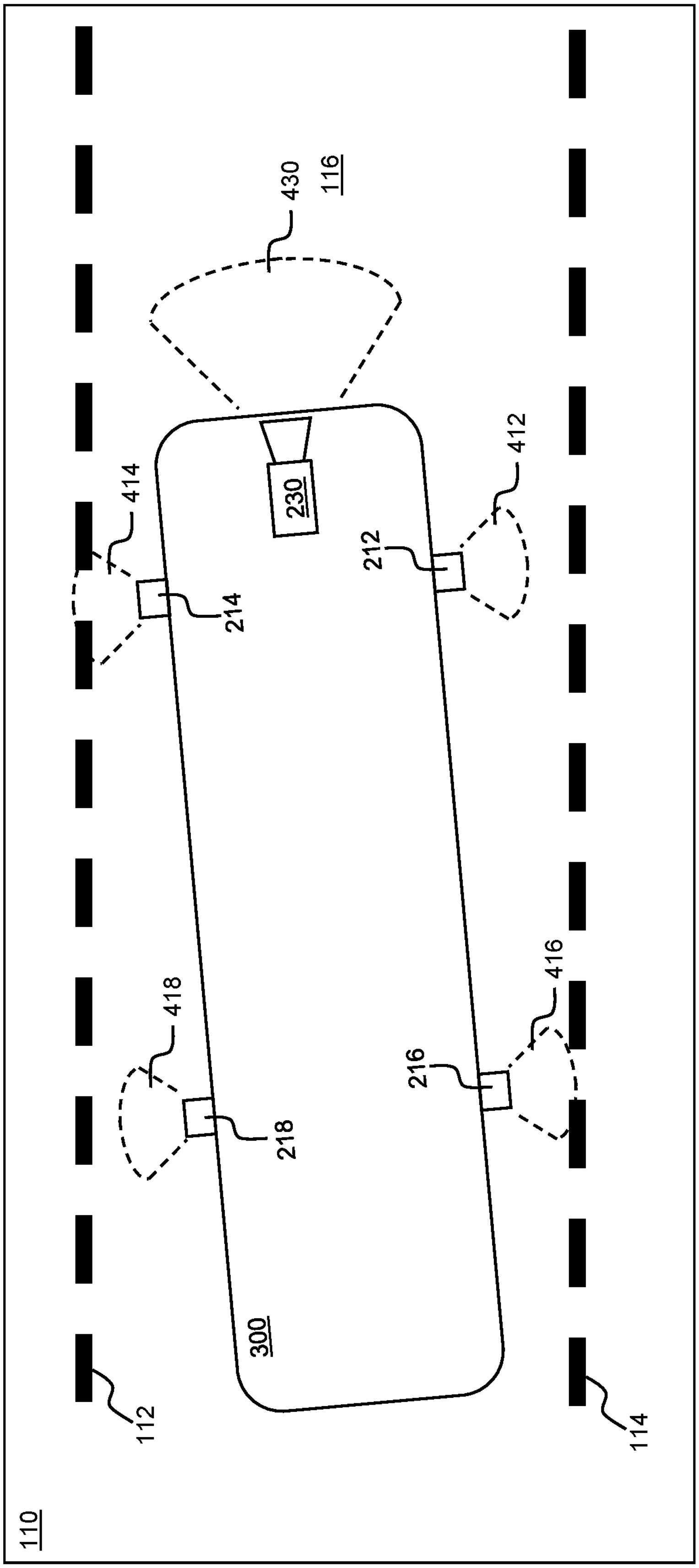

In FIG. 4*b* the vehicle 300 has started to turn such that the front of the vehicle 300 is oriented towards the first lane marking 112. As can be seen, the first lane marking 112 now appears in the field of view 414 of the second downward-facing camera 214.

Because of the rotation of the vehicle 300 (relative to its orientation in FIG. 4*a*), the second lane marking 114 now appears in the field of view 416 of the third downward facing camera 216 (if provided).

The presence of the first and/or second lane markings 112, 114 in the images or data received by the processor 220 from the second and third downward-facing cameras 214, 216 or their associated image processing subsystem(s) may be indicative that the vehicle 300 is beginning to stray outside the lane 116, or is at risk of straying outside the lane 116. However, the presence of the first and/or second lane markings 112, 114 in the images or data received by the processor 220 from the second and third downward-facing cameras 214, 216 or their associated image processing subsystem(s) may also be indicative that the position of the vehicle 300 in the lane has changed for some other reason, e.g. in preparation for making a turn, or to avoid an obstacle.

The processor 220 uses the data (image data or lane marking data) from the downward-facing cameras 212-218 or their associated image processing subsystem(s) in combination with auxiliary data received from the mapping/location/route planning unit 240 and/or the forward-facing camera 230 to determine or infer whether the movement of the vehicle 300 is indicative that the vehicle is beginning to stray outside the lane 116. For example, based on location data (e.g. coordinates received from a global navigation satellite system (GNSS) receiver such as a Global Positioning System (GPS) receiver) received from the mapping/location/route planning unit 240 indicative of a current location of the vehicle 300 and route planning data (e.g. a map of or showing the lane in which the vehicle is located) received from the mapping/location/route planning unit 240, the processor 220 can determine whether the vehicle 300 is approaching a turn, e.g. if the current location of the vehicle is within some threshold distance of a turn in a planned route for the vehicle 300. If so, the processor 220 may determine or infer that the movement of the vehicle 300 is in preparation for making the turn, and may thus take no action to alert a driver of the vehicle 300 or to correct the vehicle's course. If the auxiliary data received from the mapping/location/route planning unit 240 indicates that the vehicle 300 is not approaching a turn, the processor 220 may infer that the movement of the vehicle 300 is not related to an approaching turn and thus may be indicative that the vehicle 300 has started to stray outside the lane 116, or is at risk of straying outside the lane 116.

The processor 220 may therefore immediately take action to warn the driver of the vehicle 300, by transmitting an appropriate control signal to the driver warning subsystem 250, and/or the processor 220 may immediately take action to correct the course of the vehicle 300, by transmitting appropriate control signals to one or more of the brake controller subsystem 260, throttle controller subsystem 270 and steering controller subsystem 280 to cause the subsystem(s) to brake, steer or accelerate the vehicle 300 in order to correct its course.

Alternatively, to avoid unnecessarily correcting the course of the vehicle 300, the processor 220 may defer taking any action. For example, the processor 220 may estimate, calculate, extract or otherwise determine a value representative of a distance between the vehicle 300 (e.g. the front of the vehicle 300) and the first lane marking 112 based on the data (image data or lane marking data) received from the downward-facing cameras 212-218 or their associated image processing subsystem(s). If the processor 220 determines that this value is greater than a threshold, the processor 220 may defer taking any action to allow time for the vehicle 300 to correct its course without intervention by the processor 220. However, if the processor 220 determines that the value representative of the distance between the vehicle 300 and the first lane marking 112 is equal to or less than the threshold, the processor 220 may immediately take action to warn the driver and/or correct the course of the vehicle 300, as there may not be sufficient time for the vehicle 300 to correct its course without intervention by the processor 220.

In another example, based on data (image data or lane marking data) received from the forward-facing camera 230, the processor 220 can determine whether the vehicle 300 is approaching a turn, e.g. if the image data from the forward-facing camera 230 shows a turn in the road 110 ahead. If so, the processor 220 may determine or infer that the movement of the vehicle 300 is in preparation for making the turn, and may thus take no action to alert a driver of the vehicle 300 or to correct the vehicle's course. If the auxiliary data received from the forward-facing camera 230 indicates that the vehicle 300 is not approaching a turn (e.g. if the image data from the forward-facing camera shows that the road ahead is straight) the processor 220 may infer that the movement of the vehicle 300 is not related to an approaching turn and thus may be indicative that the vehicle 300 has started to stray outside the lane 116, or is at risk of straying outside the lane 116.

The processor 220 may therefore immediately take action to warn the driver of the vehicle 300, by transmitting an appropriate control signal to the driver warning subsystem 250, and/or the processor 220 may immediately take action to correct the course of the vehicle 300, by transmitting appropriate control signals to one or more of the brake controller subsystem 260, throttle controller subsystem 270 and steering controller subsystem 280 to cause the subsystem(s) to brake, steer or accelerate the vehicle 300 in order to correct its course.

If the image data from the forward-facing camera 230 indicates the presence of an obstacle in the path of the vehicle 300, the processor may defer taking any action to warn the driver or to correct the course of the vehicle 300.

Additionally, to avoid unnecessarily correcting the course of the vehicle 300, the processor 220 may defer taking any action. For example, the processor 220 may estimate, calculate, extract or otherwise determine a value representative of a distance between the vehicle 300 (e.g. the front of the vehicle 300) and the first lane marking 112 based on the data (image data or lane marking data) received from the downward-facing cameras 212-218 or their associated image processing subsystem(s). If the processor 220 determines that this value is greater than a threshold, the processor 220 may defer taking any action to allow time for the vehicle 300 to correct its course without intervention by the processor 220. However, if the processor 220 determines that the value representative of the distance between the vehicle 300 and the first lane marking 112 is equal to or less than the threshold, the processor 220 may immediately take action to warn the driver and/or correct the course of the vehicle 300, as there may not be sufficient time for the vehicle 300 to correct its course without intervention by the processor 220.

Figure 4C:
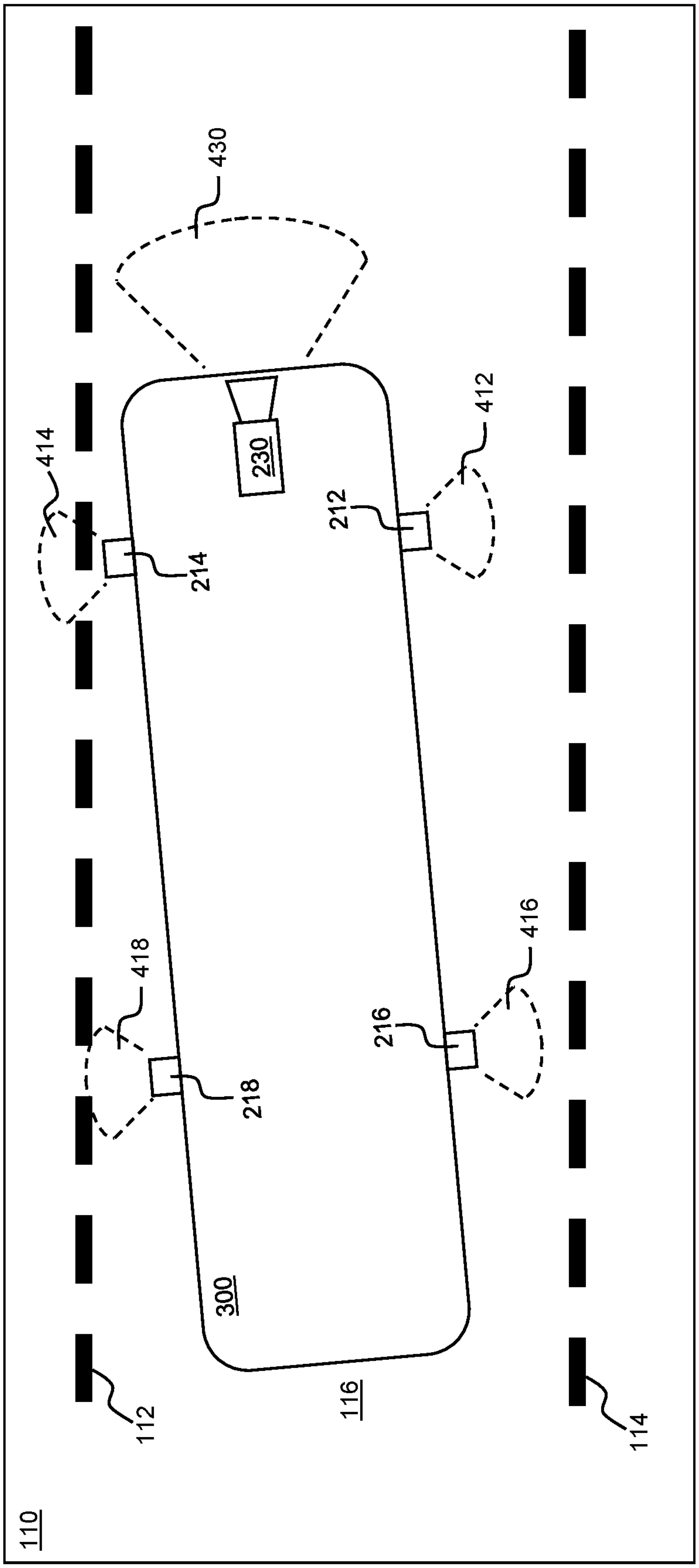

In FIG. 4*c* the vehicle 300 has continued on the course started in FIG. 4*b*, such that the front of the vehicle 300 is now closer to the first lane marking 112. As can be seen, the first lane marking 112 still appears in the field of view 414 of the second downward-facing camera 214, and now also appears in the field of view 418 of the fourth downward-facing camera 218 (if provided). The second lane marking 114 no longer appears in the field of view 416 of the third downward facing camera 216 (if provided).

The presence of the first lane marking 112 in the images from the second and fourth downward-facing cameras 214, 218 or their associated image processing subsystem(s) may be indicative that the vehicle 300 is beginning to stray outside the lane 116, or is at risk of straying outside the lane 116. However, as before the presence of the first lane marking 112 in the images received from the second and fourth downward-facing cameras 214, 218 may also be indicative that the position of the vehicle 300 in the lane has changed for some other reason, e.g. in preparation for making a turn, or to avoid an obstacle.

The processor 220 thus again uses the data (image data or lane marking data) from the downward-facing cameras 212-218 in combination with auxiliary data received from the mapping/location/route planning unit 240 and/or the forward-facing camera 230 to determine or infer whether the movement of the vehicle 300 is indicative that the vehicle is beginning to stray outside the lane 116.

For example, based on location data (e.g. GNSS coordinates) received from the mapping/location/route planning unit 240 indicative of a current location of the vehicle 300 and route planning data received from the mapping/location/route planning unit 240, the processor 220 can determine whether the vehicle 300 is approaching a turn as described above. If so, the processor 220 may determine or infer that the movement of the vehicle 300 is in preparation for making the turn, and may thus take no action to alert a driver of the vehicle 300 or to correct the vehicle's course. If the auxiliary data received from the mapping/location/route planning unit 240 indicates that the vehicle 300 is not approaching a turn, the processor 220 may infer that the movement of the vehicle 300 is not related to an approaching turn and thus may be indicative that the vehicle 300 has started to stray outside the lane 116, or is at risk of straying outside the lane 116.

In the situation illustrated in FIG. 4*c* the processor 220 may immediately take action to warn the driver of the vehicle 300, because the distance between the front of the vehicle 300 and the first lane marking 112 (as determined by the processor 220 based on the data received from the second downward-facing camera 214). Thus the processor 220 may transmit appropriate control signals to the driver warning subsystem 250, and/or to one or more of the brake controller subsystem 260, throttle controller subsystem 270 and steering controller subsystem 280 to cause the subsystem(s) to brake, steer or accelerate the vehicle 300 in order to correct its course.

In another example, based on image data received from the forward-facing camera 230, the processor 220 can determine whether the vehicle 300 is approaching a turn, e.g. if the image data from the forward-facing data shows a turn in the road 110 ahead. If so, the processor 220 may determine or infer that the movement of the vehicle 300 is in preparation for making the turn, and may thus take no action to alert a driver of the vehicle 300 or to correct the vehicle's course. If the auxiliary data received from the forward-facing camera 230 indicates that the vehicle 300 is not approaching a turn (e.g. if the image data from the forward-facing camera shows that the road ahead is straight) the processor 220 may infer that the movement of the vehicle 300 is not related to an approaching turn and thus may be indicative that the vehicle 300 has started to stray outside the lane 116, or is at risk of straying outside the lane 116. Again, in the situation illustrated in FIG. 4*c* the processor 220 may immediately take action to warn the driver of the vehicle 300, because the distance between the front of the vehicle 300 and the first lane marking 112 (as determined by the processor 220 based on the data received from the second downward-facing camera 214). Thus the processor 220 may transmit appropriate control signals to the driver warning subsystem 250, and/or to one or more of the brake controller subsystem 260, throttle controller subsystem 270 and steering controller subsystem 280 to cause the subsystem(s) to brake, steer or accelerate the vehicle 300 in order to correct its course.

As before, if the image data from the forward-facing camera 230 indicates the presence of an obstacle in the path of the vehicle 300, the processor may defer taking any action to warn the driver or to correct the course of the vehicle 300, to allow the vehicle 300 to complete a manoeuvre to avoid the obstacle.

Figure 4D:
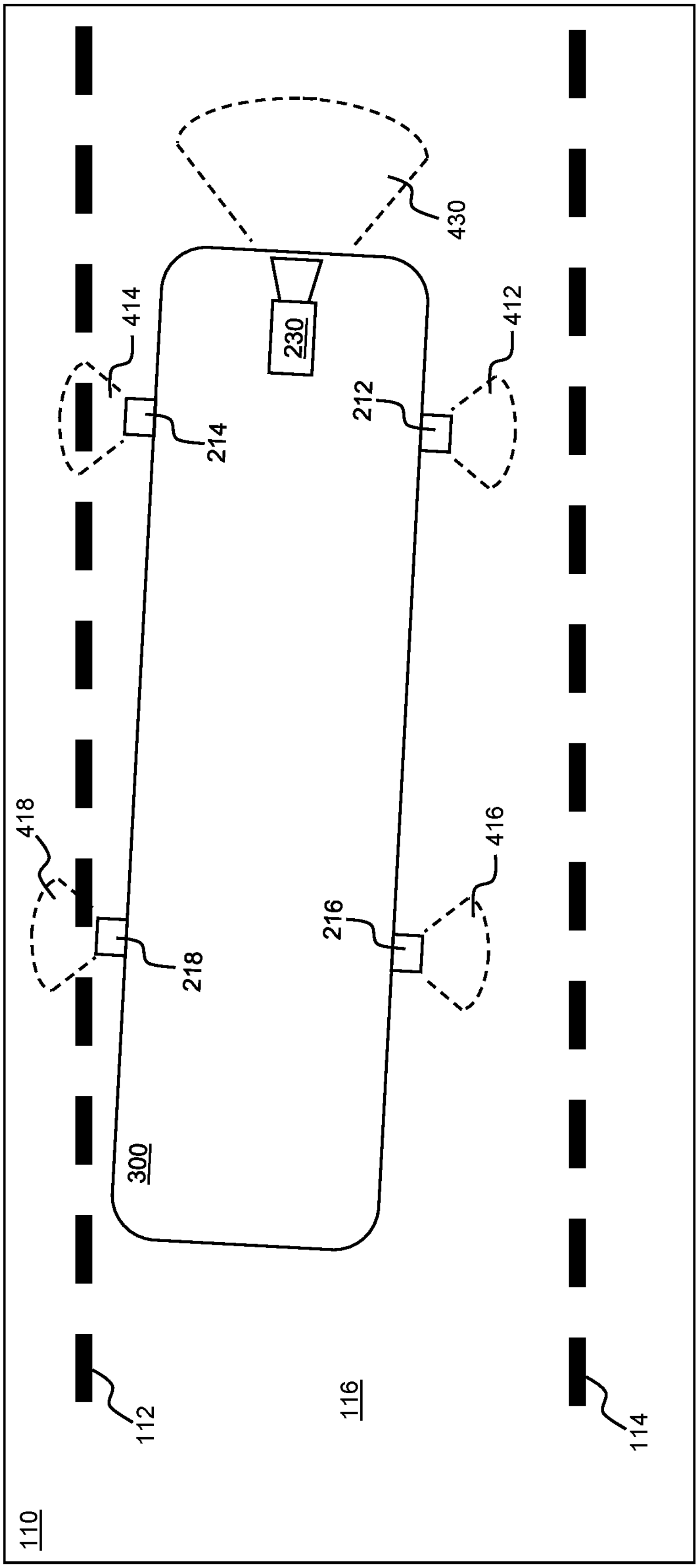

In FIG. 4*d* the vehicle 300 has changed course following corrective action taken either by the driver of the vehicle 300 in response to a warning from the driver warning subsystem 250, or by one or more of the brake controller, throttle controller and steering controller subsystems 260-280 in response to control signals issued by the processor 220.

As can be seen, the front of the vehicle 300 is now oriented towards the middle of the lane 116. The first lane marking 112 still appears in the fields of view 414, 418 of the second and fourth downward-facing cameras 214, 218. However, the distance between the front of the vehicle 300 and the first lane marking 112 has increased, in comparison to the situation illustrated in FIG. 4*c*.

The processor 220 continues to monitor the data (image data or lane marking data) received from the downward facing cameras 212-218 or their associated image processing subsystem(s) and the auxiliary data received from the location/mapping/route planning unit 240 and/or the forward-facing camera 230 to determine when the course of the vehicle 300 has been corrected.

Figure 4E:
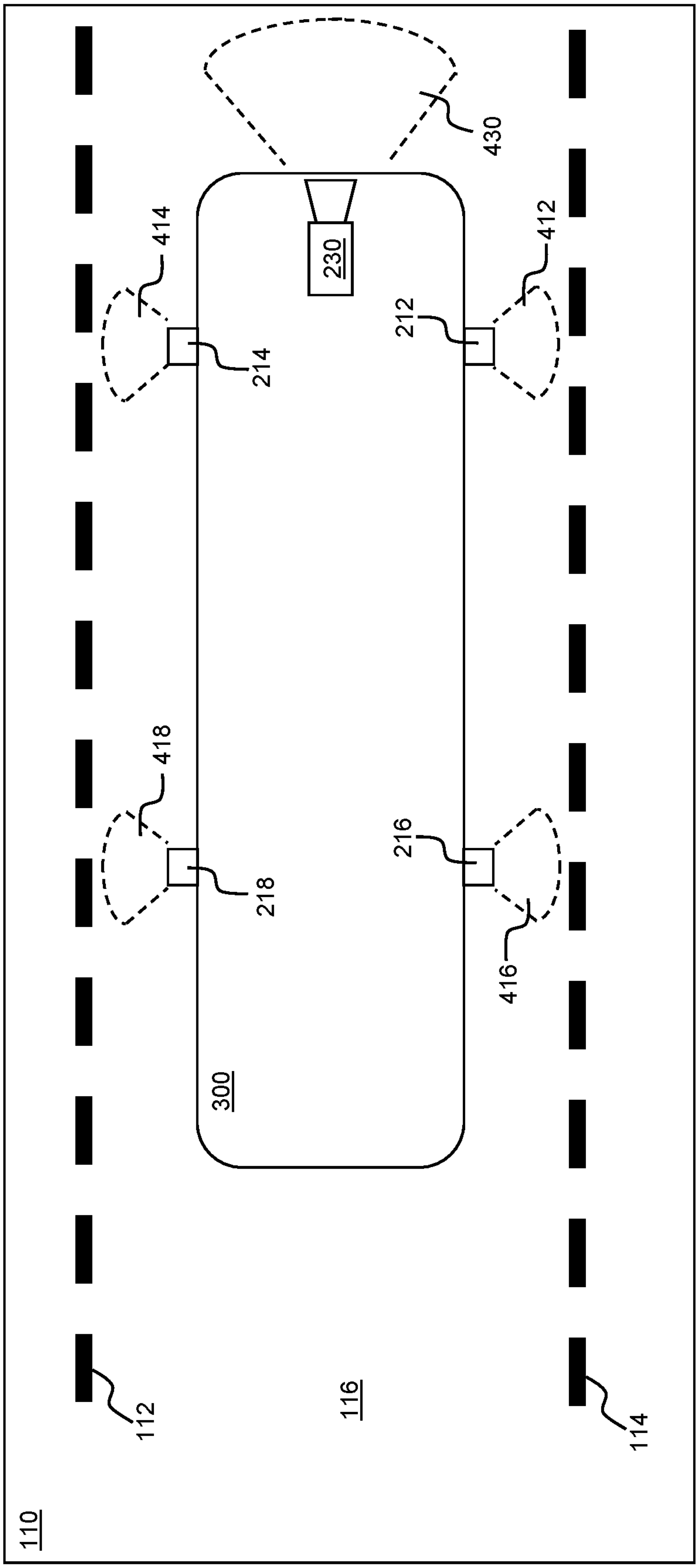

In FIG. 4*e* the vehicle 300 has returned to a generally central position in the lane 116. As can be seen, neither of the lane markings 112, 114 appears in the field of view 412-418 of any of the downward-facing cameras 212-218. Based on the data from the downward-facing cameras 212-218 or their associated image processing subsystem(s) and the auxiliary data from the location/mapping/route planning unit 240 and/or the forward-facing camera 230, the processor 220 may infer that the road ahead is straight and that the vehicle 300 is correctly positioned in the lane 116, and may thus discontinue any corrective action such that the vehicle 300 is able to continue on its course without intervention by the processor 220.

In the example illustrated in FIGS. 4*a*-4*e* the processor 220 determines the position of the vehicle 300 within the lane 116 based on whether the lane markings 112, 114 appear in the fields of view 412-418 of the cameras 112-118. The system 200 may determine that the vehicle 300 is positioned generally centrally within the lane 116 if the lane markings do not appear in the field of view of any of the cameras 112-118.

In an alternative approach, illustrated in FIGS. 5*a*-5*e*, the cameras 112-118 each have a larger field of view 512-518 than in the example illustrated in FIGS. 4*a*-4*e*, and the processor 220 determines the position of the vehicle 300 within the lane 116 based on the data (image data or lane marking data) received from the cameras 112-118 or their associated image processing subsystem(s).

For example, the processor 220 may determine a distance between the first lane marking 312 and the second side 320 of the vehicle 300 based on image data received from the second and/or fourth cameras 214, 218, or based on data indicating the location of the first lane marking 112 received from image processing subsystem(s) associated with the second and/or fourth cameras 214, 218.

Similarly, the processor 220 may determine a distance between the second lane marking 314 and the first side 310 of the vehicle 300 based on image data received from the first and/or third cameras 212, 216, or based on data indicating the location of the second lane marking 114 received from image processing subsystem(s) associated with the first and/or third cameras 212, 216.

Figure 5A:
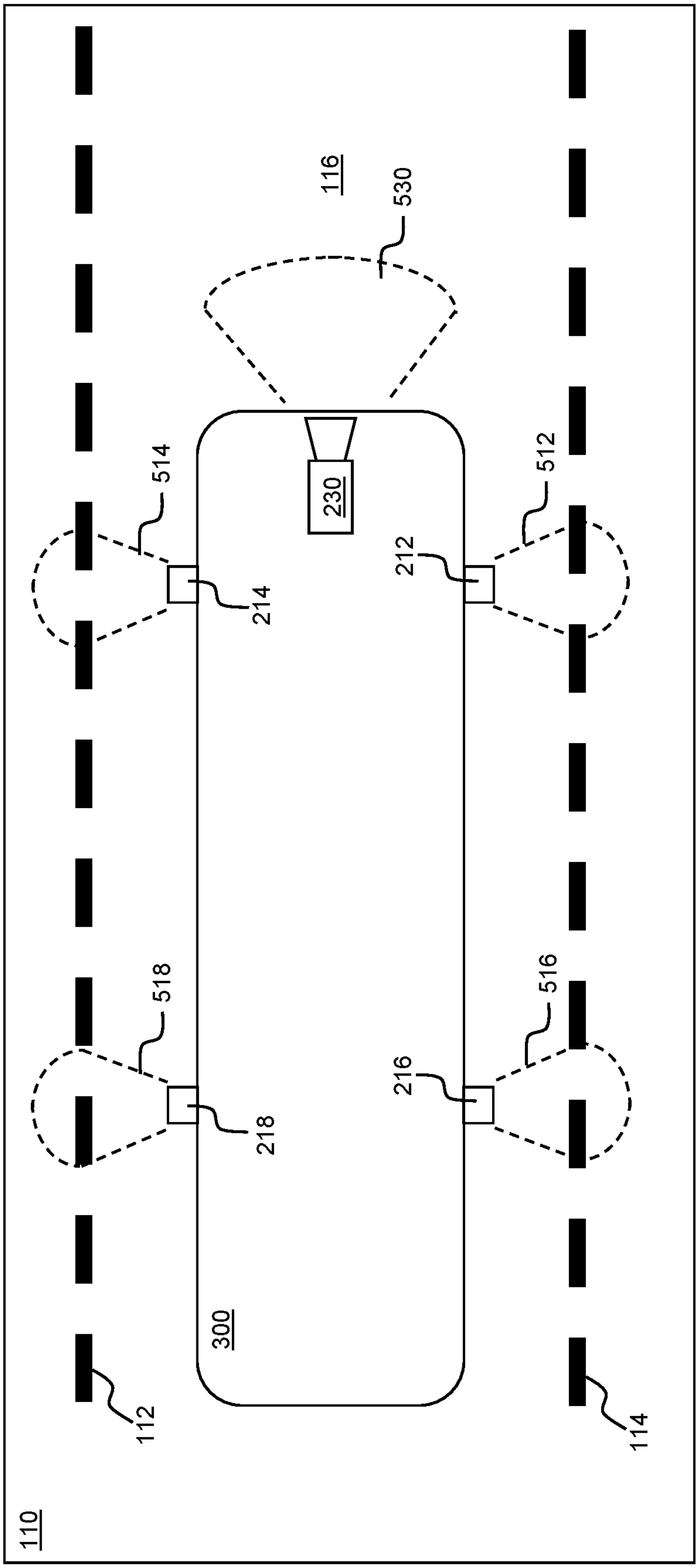
FIGS. 5*a*-5*e* are alternative schematic views from above showing the vehicle of FIGS. 3*a* and 3*b* as it travels along a road.

In FIG. 5*a* the vehicle 300 is shown as being positioned generally centrally in the lane 116. As can be seen in FIG. 5*a*, both of the lane markings 112, 114 are within the field of view of all of the downward-facing cameras 212-218. Thus, the images captured by the cameras 212-218 will include the lane markings 112, 114 and the processor 220, or the image processing subsystems of or associated with the cameras 212-218, can determine the distances between the lane markings 112, 114 and the vehicle (or values representative of such distances). For example, based on the data (image data or lane marking data) received from the cameras 212-218, the processor 220 may determine or calculate a first distance between the lane marking 114 and the first side 310 of the vehicle 300 (or a first value representative of that distance), and a second distance between the lane marking 112 and the second side 320 of the vehicle 300 (or a second value representative of that distance).

The controller 220 monitors the distances between the vehicle 300 and the lane markings 112, 114 as the vehicle 300 travels along the road 110, based on the data (either image data or lane marking data) provided by the cameras 112-118 or their associated image processing subsystem(s). If the distances between the lane markings 112, 114 and the vehicle 300 (or the first and second values representing such distances) remain within a predefined threshold, the controller 220 may determine or infer that the vehicle 300 is correctly positioned within the lane, and thus may take no corrective action.

Figure 5B:
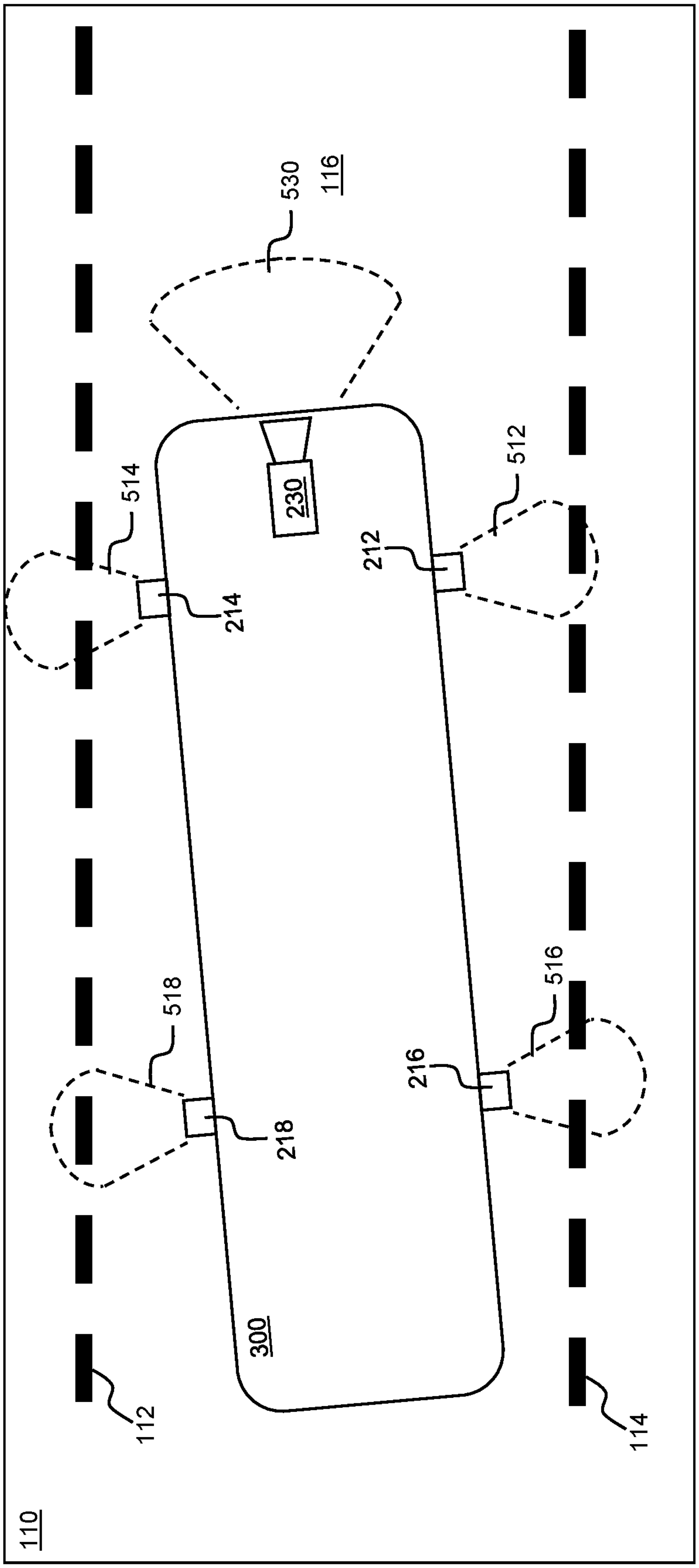

In FIG. 5*b* the vehicle 300 has started to turn such that the front of the vehicle 300 is oriented towards the first lane marking 112. Thus, the distance between the vehicle 300 and the first lane marking 112 has decreased, and the distance between the vehicle 300 and the second lane marking 114 has increased. These changes in the distances between the vehicle 300 and the lane markings 112, 114 may be indicative that the vehicle 300 is beginning to stray outside the lane 116, or is at risk of straying outside the lane 116. Alternatively, these changes in the distances between the vehicle 300 and the lane markings 112, 114 may be indicative that the position of the vehicle 300 in the lane has changed for some other reason, e.g. in preparation for making a turn, or to avoid an obstacle.

The processor 220 uses the data (image data or lane marking data) from the downward-facing cameras 212-218 or their associated image processing subsystem(s) in combination with auxiliary data received from the mapping/location/route planning unit 240 and/or the forward-facing camera 230 to determine or infer whether the movement of the vehicle 300 is indicative that the vehicle is beginning to stray outside the lane 116.

For example, based on location data (e.g. coordinates received from a global navigation satellite system (GNSS) receiver such as a Global Positioning System (GPS) receiver) received from the mapping/location/route planning unit 240 indicative of a current location of the vehicle 300 and route planning data (e.g. a map of or showing the lane in which the vehicle is located) received from the mapping/location/route planning unit 240, the processor 220 can determine whether the vehicle 300 is approaching a turn, e.g. if the current location of the vehicle is within some threshold distance of a turn in a planned route for the vehicle 300. If so, the processor 220 may determine or infer that the movement of the vehicle 300 is in preparation for making the turn, and may thus take no action to alert a driver of the vehicle 300 or to correct the vehicle's course. If the auxiliary data received from the mapping/location/route planning unit 240 indicates that the vehicle 300 is not approaching a turn, the processor 220 may infer that the movement of the vehicle 300 is not related to an approaching turn and thus may be indicative that the vehicle 300 has started to stray outside the lane 116, or is at risk of straying outside the lane 116.

The processor 220 may therefore immediately take action to warn the driver of the vehicle 300, by transmitting an appropriate control signal to the driver warning subsystem 250, and/or the processor 220 may immediately take action to correct the course of the vehicle 300, by transmitting appropriate control signals to one or more of the brake controller subsystem 260, throttle controller subsystem 270 and steering controller subsystem 280 to cause the subsystem(s) to brake, steer or accelerate the vehicle 300 in order to correct its course.

Alternatively, to avoid unnecessarily correcting the course of the vehicle 300, the processor 220 may defer taking any action. For example, the processor 220 may determine whether the distance between the vehicle 300 and the first lane marking 300 (or the first value representative of the distance between the vehicle 300 and the first lane marking 112) is greater than a threshold, the processor 220 may defer taking any action to allow time for the vehicle 300 to correct its course without intervention by the processor 220. However, if the processor 220 determines that the distance between the vehicle 300 and the first lane marking 300 (or the value representative of the distance between the vehicle 300 and the first lane marking 112) is equal to or less than the threshold, the processor 220 may immediately take action to warn the driver and/or correct the course of the vehicle 300, as there may not be sufficient time for the vehicle 300 to correct its course without intervention by the processor 220.

In another example, based on data (image data or lane marking data) received from the forward-facing camera 230, the processor 220 can determine whether the vehicle 300 is approaching a turn, e.g. if the image data from the forward-facing camera 230 shows a turn in the road 110 ahead. If so, the processor 220 may determine or infer that the movement of the vehicle 300 is in preparation for making the turn, and may thus take no action to alert a driver of the vehicle 300 or to correct the vehicle's course. If the auxiliary data received from the forward-facing camera 230 indicates that the vehicle 300 is not approaching a turn (e.g. if the image data from the forward-facing camera shows that the road ahead is straight) the processor 220 may infer that the movement of the vehicle 300 is not related to an approaching turn and thus may be indicative that the vehicle 300 has started to stray outside the lane 116, or is at risk of straying outside the lane 116.

The processor 220 may therefore immediately take action to warn the driver of the vehicle 300, by transmitting an appropriate control signal to the driver warning subsystem 250, and/or the processor 220 may immediately take action to correct the course of the vehicle 300, by transmitting appropriate control signals to one or more of the brake controller subsystem 260, throttle controller subsystem 270 and steering controller subsystem 280 to cause the subsystem(s) to brake, steer or accelerate the vehicle 300 in order to correct its course.

If the image data from the forward-facing camera 230 indicates the presence of an obstacle in the path of the vehicle 300, the processor may defer taking any action to warn the driver or to correct the course of the vehicle 300.

Additionally, to avoid unnecessarily correcting the course of the vehicle 300, or if the processor 220 may defer taking any action. For example, the processor 220 may determine whether the distance between the vehicle 300 and the first lane marking 300 (or the first value representative of the distance between the vehicle 300 and the first lane marking 112) is greater than a threshold, the processor 220 may defer taking any action to allow time for the vehicle 300 to correct its course without intervention by the processor 220. However, if the processor 220 determines that the distance between the vehicle 300 and the first lane marking 300 (or the value representative of the distance between the vehicle 300 and the first lane marking 112) is equal to or less than the threshold, the processor 220 may immediately take action to warn the driver and/or correct the course of the vehicle 300, as there may not be sufficient time for the vehicle 300 to correct its course without intervention by the processor 220.

Figure 5C:
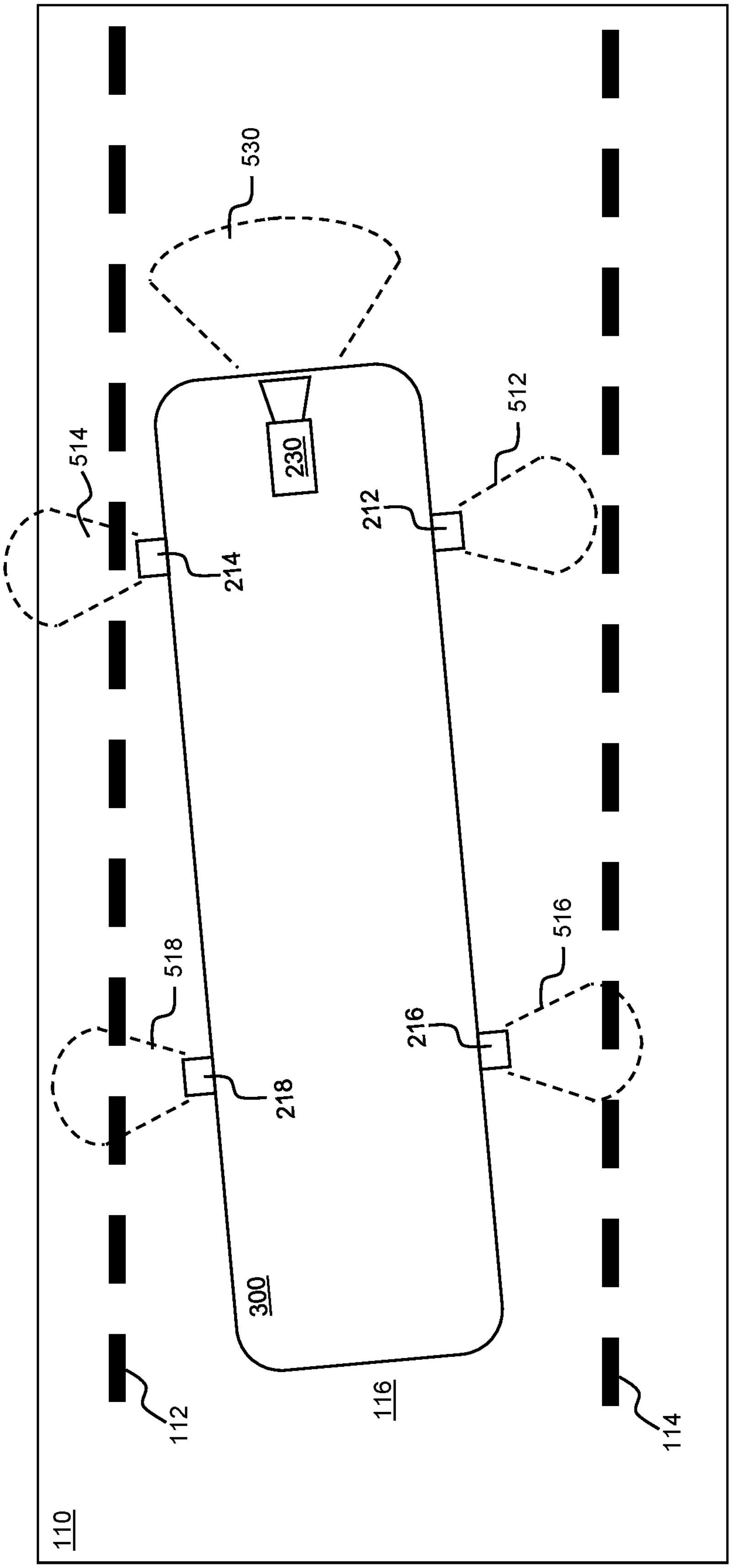

In FIG. 5*c* the vehicle 300 has continued on the course started in FIG. 5*b*, such that the front of the vehicle 300 is now closer to the first lane marking 112. Thus, the distance between the vehicle 300 and the first lane marking 112 has decreased further, and the distance between the vehicle 300 and the second lane marking 114 has increased further. These changes in the distances between the vehicle 300 and the lane markings 112, 114 may be indicative that the vehicle 300 is beginning to stray outside the lane 116, or is at risk of straying outside the lane 116. However, as before, these changes in the distances between the vehicle 300 and the lane markings 112, 114 may be indicative that the position of the vehicle 300 in the lane has changed for some other reason, e.g. in preparation for making a turn, or to avoid an obstacle.

The processor 220 thus again uses the data (image data or lane marking data) from the downward-facing cameras 212-218 or their associated image processing subsystem(s) in combination with auxiliary data received from the mapping/location/route planning unit 240 and/or the forward-facing camera 230 to determine or infer whether the movement of the vehicle 300 is indicative that the vehicle is beginning to stray outside the lane 116.

For example, based on location data (e.g. GNSS coordinates) received from the mapping/location/route planning unit 240 indicative of a current location of the vehicle 300 and route planning data received from the mapping/location/route planning unit 240, the processor 220 can determine whether the vehicle 300 is approaching a turn as described above. If so, the processor 220 may determine or infer that the movement of the vehicle 300 is in preparation for making the turn, and may thus take no action to alert a driver of the vehicle 300 or to correct the vehicle's course. If the auxiliary data received from the mapping/location/route planning unit 240 indicates that the vehicle 300 is not approaching a turn, the processor 220 may infer that the movement of the vehicle 300 is not related to an approaching turn and thus may be indicative that the vehicle 300 has started to stray outside the lane 116, or is at risk of straying outside the lane 116.

In the situation illustrated in FIG. 5*c* the processor 220 may immediately take action to warn the driver of the vehicle 300, because the distance between the front of the vehicle 300 and the first lane marking 112 (or the first value representative of this value) is equal to or less than a threshold. Thus the processor 220 may transmit appropriate control signals to the driver warning subsystem 250, and/or to one or more of the brake controller subsystem 260, throttle controller subsystem 270 and steering controller subsystem 280 to cause the subsystem(s) to brake, steer or accelerate the vehicle 300 in order to correct its course.

In another example, based on image data received from the forward-facing camera 230, the processor 220 can determine whether the vehicle 300 is approaching a turn, e.g. if the image data from the forward-facing data shows a turn in the road 110 ahead. If so, the processor 220 may determine or infer that the movement of the vehicle 300 is in preparation for making the turn, and may thus take no action to alert a driver of the vehicle 300 or to correct the vehicle's course. If the auxiliary data received from the forward-facing camera 230 indicates that the vehicle 300 is not approaching a turn (e.g. if the image data from the forward-facing camera shows that the road ahead is straight) the processor 220 may infer that the movement of the vehicle 300 is not related to an approaching turn and thus may be indicative that the vehicle 300 has started to stray outside the lane 116, or is at risk of straying outside the lane 116. Again, in the situation illustrated in FIG. 5*c* the processor 220 may immediately take action to warn the driver of the vehicle 300, because the distance between the front of the vehicle 300 and the first lane marking 112 (or the first value representative of this distance) is equal to or less than a threshold. Thus the processor 220 may transmit appropriate control signals to the driver warning subsystem 250, and/or to one or more of the brake controller subsystem 260, throttle controller subsystem 270 and steering controller subsystem 280 to cause the subsystem(s) to brake, steer or accelerate the vehicle 300 in order to correct its course.

As before, if the image data from the forward-facing camera 230 indicates the presence of an obstacle in the path of the vehicle 300, the processor 220 may defer taking any action to warn the driver or to correct the course of the vehicle 300, to allow the vehicle 300 to complete a manoeuvre to avoid the obstacle.

Figure 5D:
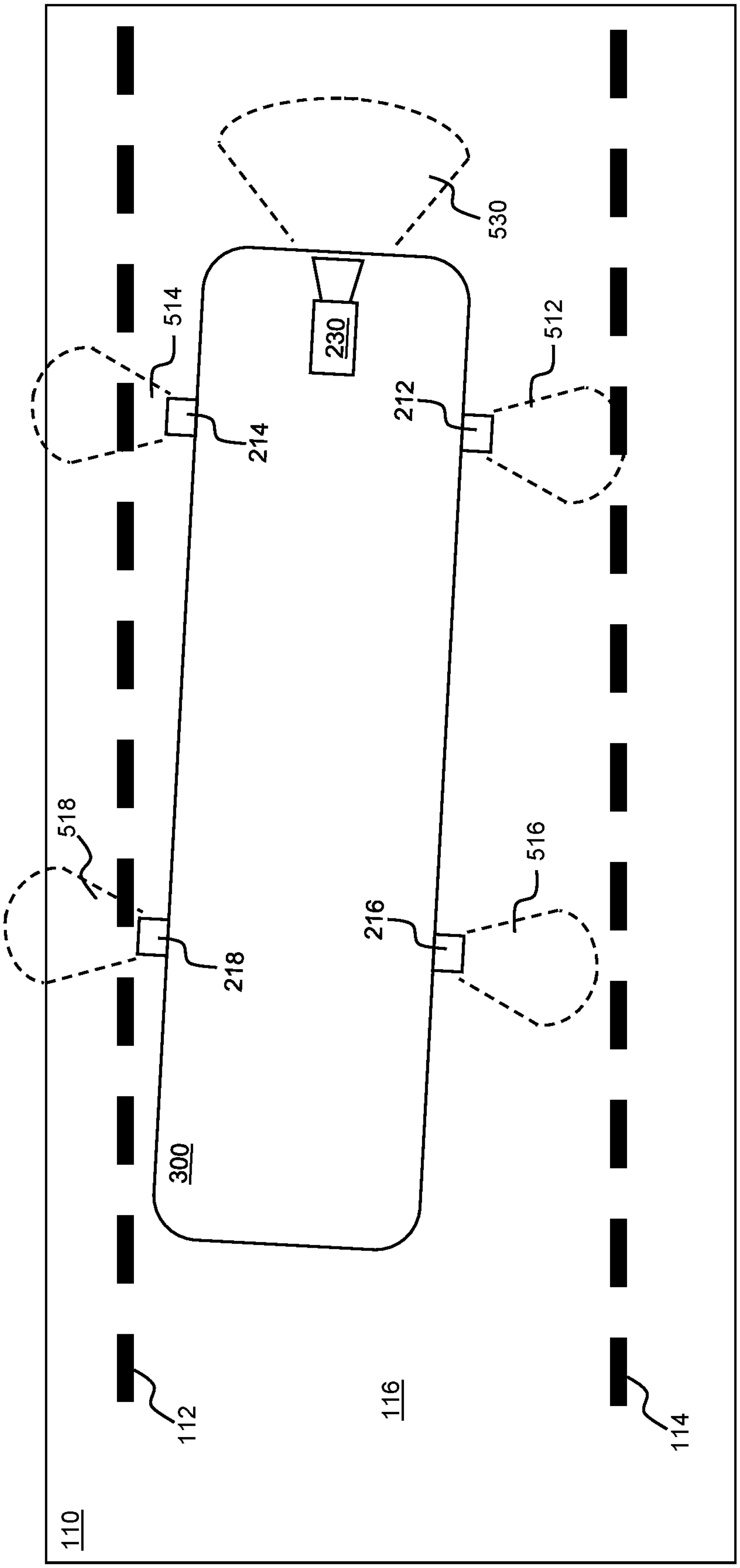

In FIG. 5*d* the vehicle 300 has changed course following corrective action taken either by the driver of the vehicle 300 in response to a warning from the driver warning subsystem 250, or by one or more of the brake controller, throttle controller and steering controller subsystems 260-280 in response to control signals issued by the processor 220.

As can be seen, the front of the vehicle 300 is now oriented towards the middle of the lane 116. The distance between the front of the vehicle 300 and the first lane marking 112 has increased, in comparison to the situation illustrated in FIG. 5*c*.

The processor 220 continues to monitor the distances between the vehicle 300 and the lane markings 112, 114 to determine when the course of the vehicle 300 has been corrected.

Figure 5E:
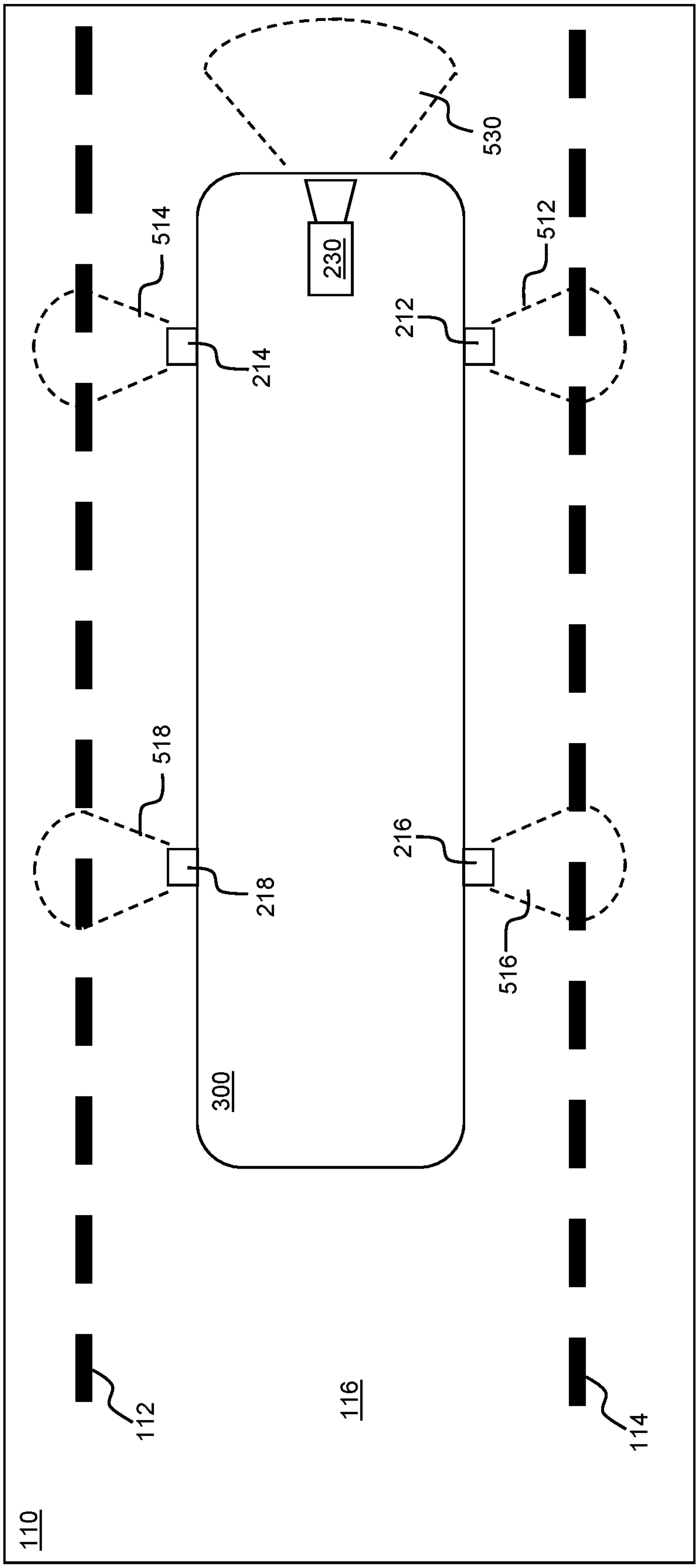

In FIG. 5*e* the vehicle 300 has returned to a generally central position in the lane 116.

Based on the distances between the vehicle 300 and the lane markings 112, 114 (or the first and second values representing those distances) and the auxiliary data from the location/mapping/route planning unit 240 and/or the forward-facing camera 230, the processor 220 may infer that the road ahead is straight and that the vehicle 300 is correctly positioned in the lane 116, and may thus discontinue any corrective action such that the vehicle 300 is able to continue on its course without intervention by the processor 220.

In the examples illustrated in FIGS. 4*a*-4*e* and 5*a*-5*e* the system 200 successfully corrects the course of the vehicle 300 when it is detected that the vehicle is at risk of straying outside the lane 116. In some circumstances, however, the processor 220 may determine that the course of the vehicle 300 cannot be safely corrected, e.g. because correcting the course of the vehicle 300 would cause it to collide with an obstacle. In such circumstances the processor 220 may initiate an emergency stop, by transmitting an appropriate control signal to the brake controller subsystem 260. In these circumstances the processor 220 may also transmit a control signal to the hazard warning subsystem to activate the vehicle's hazard warning lights, to provide a warning to following vehicles.

In the examples described above with respect to FIGS. 4*a*-4*e* and 5*a*-5*e*, the processor 220 determines whether the vehicle 300 is at risk of straying outside the lane 116 based on the distance between the vehicle 300 and a detected lane marking 112, 116 and auxiliary data.

However, as discussed above, the system 200 (e.g. the processor 220 or an image processing subsystem associated with a camera 212-218) may be further configured to estimate, calculate or otherwise determine an angle between the vehicle and a detected lane marking (e.g. an angle between the side of the vehicle and the detected lane marking), and the processor 220 may use the determined angle in addition to or instead of the determined distance between the vehicle and a detected lane marking, in conjunction with the auxiliary data, to determine whether the vehicle is at risk of straying outside the lane 116.

For example, the processor 220 may compare the determined angle to a predetermined threshold. If the determined angle exceeds the threshold, this may be indicative that the vehicle is beginning to stray outside the lane 116. The processor 220 may therefore use the determined angle in a similar manner to the determined distance (in addition to or as an alternative to the determined distance), in conjunction with the auxiliary data, to determine if the vehicle is at risk of straying outside of the lane 116 and if immediate corrective and/or warning action is required.

In the example illustrated in FIGS. 5*a*-5*e*, the field of view of each of the cameras 212-218 is shown as extending just beyond the lane markings 112, 114 of the lane 116. In some examples, however, the field of view of each of the cameras 212-218 may extend much further, such that the field of view includes at least a portion of a lane adjacent the lane 116.

This can be advantageous, as when the vehicle 300 moves from the lane 116 into a new lane adjacent the lane 116, a lane marking of the new lane comes into the field of view of the relevant one(s) of the cameras 212-218 quickly, allowing the system 200 to identify the lane marking of the new lane quickly, thus ensuring that the system 200 can continue to operate effectively to maintain the position of the vehicle 300 in the new lane.

Additionally, in a situation in which lanes become realigned, e.g. where lanes merge or where there are temporary lane markings, the system 200 can quickly detect a suitable lane marking with which to align the vehicle with, thus ensuring that the system can continue to operate effectively to maintain the position of the vehicle in a lane.

The system 200 may be installed during manufacture of the vehicle 300. The system 200 may also be retrofitted to an existing vehicle, which may be a non-autonomous (e.g. autonomy level 0) vehicle, or a vehicle having some degree of autonomy (e.g. a level 1, 2 or 3 autonomous vehicle) to provide or increase a level of autonomy of the vehicle.

In the examples above, the vehicle is described as being a bus, but it will be appreciated that the system 200 can equally be provided, installed or fitted in other vehicles such as cars, vans, minibuses, trucks, lorries, taxis and the like.

As will be apparent from the foregoing description, the system 200 enables the position of a vehicle within a lane of a road to be monitored reliably in a wide range of road and weather conditions, and corrective action to be taken, either autonomously by the system, or by a driver of the vehicle, if the system detects that the vehicle is at risk of straying outside the lane.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications, embodiments will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re) programmable analogue array or similar device in order to configure analogue hardware.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A system for monitoring a position of a vehicle in a lane of a road, the system comprising:

a processor;

a first camera configured to output first image data relating to a surface of the road on a first side of the vehicle;

a second camera configured to output second image data relating to a surface of the road on a second side of the vehicle, wherein the processor is configured to:

receive auxiliary data indicating whether or not the vehicle is approaching a turn or obstacle in the road;

infer, estimate or determine the position of the vehicle relative to a lane marking that delimits a boundary of the lane detected in the image data from one or more of the cameras;

determine a value representative of a distance between the vehicle and the lane marking based on the first or second image data;

compare the value to a threshold;

output a control signal to one or more of: a driver warning system; a brake control subsystem; a throttle control subsystem; and a steering control subsystem when it is determined that the vehicle is at risk of straying outside the lane and the value is equal to or less than the threshold; and defer outputting the control signal when it is determined that the vehicle is at risk of straying outside the lane and the value is greater than the threshold.

2. A system according to claim 1, wherein the auxiliary data is received from a forward-facing camera provided on the vehicle or from a mapping, location or route planning system.

3. A system according to claim 1, wherein:

the first and second cameras are each provided or associated with an image processing subsystem;

the image processing subsystem is configured to detect the presence and/or position of a lane marking in the image data provided by the respective camera and to transmit data indicative of the presence and/or position of the lane marking to the processor; and the processor is configured to determine the value representative of the distance and/or the angle between the vehicle and the lane marking based on the data indicative of the presence and/or position of the lane marking.

4. A system according to claim 3, wherein the image processing subsystem is configured to detect the presence of a lane marking based on a difference in colour or a difference in contrast between the lane marking and the surface of the road.

5. A system according to claim 1, wherein the processor is configured to detect the presence of a lane marking in the first or second image data based on a difference in colour or a difference in contrast between the lane marking and the surface of the road.

6. A system according to claim 1, further comprising:

a third camera configured to output third image data relating to the surface of the road on the first side of the vehicle; and a fourth camera configured to output fourth image data relating to the surface of the road on the second side of the vehicle.

7. A system according to claim 1, wherein each camera is provided with a source of illumination such as an infra-red lamp.

8. A system according to claim 1, wherein the processor is configured to:

determine that the change of the position of the vehicle in the lane is indicative that the vehicle is at risk of straying outside the lane if the auxiliary data is not indicative that the vehicle is approaching a turn or obstacle; and determine that the change of the position of the vehicle in the lane is in preparation for making the turn or avoiding the obstacle if the auxiliary data is indicative that the vehicle is approaching a turn or obstacle.

9. A system according to claim 1, wherein the processor is further configured to distinguish between a lane marking on the road and other features of the surface of the road based on a predefined range of shapes and/or sizes of lane markings.

10. A system according to claim 1, wherein the processor is configured to estimate a position of the vehicle within the lane based on the first image data or the second image data, and to determine if the vehicle is at risk of straying outside the lane based on the estimated position of the vehicle and the auxiliary data.

11. A vehicle comprising a system for monitoring a position of the vehicle in a lane of a road, wherein the system comprises:

a processor;

a first camera positioned on a first side of the vehicle in a downward-facing orientation to provide first image data relating to a surface of the road on the first side of the vehicle;

a second camera positioned on a second side of the vehicle in a downward-facing orientation to provide second image data relating to a surface of the road on a second side of the vehicle, wherein the processor is configured to:

determine if the vehicle is at risk of straying outside the lane based on the first image data or the second image data and auxiliary data received by the processor;

determine a value representative of a distance between the vehicle and a lane marking that delimits a boundary of the lane based on the first or second image data;

compare the value to a threshold;

output a control signal to one or more of a driver warning system; a brake control subsystem: a throttle control subsystem; and a steering control subsystem when it is determined that the vehicle is at risk of straying outside the lane and the value is equal to or less than the threshold; and defer outputting the control signal when it is determined that the vehicle is at risk of straying outside the lane and the value is greater than the threshold.

12. A vehicle according to claim 11, wherein the vehicle further comprises a forward-facing camera or a mapping, location or route planning system for providing the auxiliary data to the processor for providing the auxiliary data to the processor.

13. A vehicle according to claim 11, wherein:

the first and second cameras are each provided or associated with an image processing subsystem;

the image processing subsystem is configured to detect the presence and/or position of a lane marking in the image data output by the respective camera and to transmit data indicative of the presence and/or position of the lane marking to the processor; and the processor is configured to determine the value representative of the distance and/or angle between the vehicle and the lane marking based on the data indicative of the presence and/or position of the lane marking.

14. A vehicle according to claim 11, wherein each camera is provided with a source of illumination comprising an infra-red lamp.

15. A vehicle according to claim 11, wherein the vehicle comprises a bus, a minibus, a car, a van, a lorry, a truck or a taxi.

16. A vehicle according to claim 11, wherein the processor is configured to:

determine that the change of the position of the vehicle in the lane is indicative that the vehicle is at risk of straying outside the lane if the auxiliary data is not indicative that the vehicle is approaching a turn or obstacle; and determine that the change of the position of the vehicle in the lane is in preparation for making the turn or avoiding the obstacle if the auxiliary data is indicative that the vehicle is approaching a turn or obstacle.

17. A vehicle according to claim 11, wherein the processor is further configured to distinguish between a lane marking on the road and other features of the surface of the road based on a predefined range of shapes and/or sizes of lane markings.

18. A vehicle according to claim 11, wherein the processor is configured to estimate a position of the vehicle within the lane based on the first image data or the second image data, and to determine if the vehicle is at risk of straying outside the lane based on the estimated position of the vehicle and the auxiliary data.

* * * * *